United States Patent
Enomoto

(10) Patent No.: US 9,280,302 B2
(45) Date of Patent: Mar. 8, 2016

(54) IMAGE FORMING APPARATUS THAT GENERATES LOG IMAGE, IMAGE FORMING SYSTEM, AND NON-TRANSITORY RECORDING MEDIUM

(71) Applicant: Kyocera Document Solutions Inc., Osaka (JP)

(72) Inventor: Kyozo Enomoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 69 days.

(21) Appl. No.: 14/084,845

(22) Filed: Nov. 20, 2013

(65) Prior Publication Data
US 2014/0153050 A1 Jun. 5, 2014

(30) Foreign Application Priority Data
Nov. 30, 2012 (JP) .................. 2012-263848

(51) Int. Cl.
| | |
|---|---|
| *G06F 15/00* | (2006.01) |
| *G06F 3/12* | (2006.01) |
| *H04N 1/00* | (2006.01) |
| *H04N 1/32* | (2006.01) |
| *G06F 11/14* | (2006.01) |
| *G06F 11/34* | (2006.01) |

(52) U.S. Cl.
CPC ............ *G06F 3/1203* (2013.01); *G06F 3/1273* (2013.01); *G06F 3/1285* (2013.01); *G06F 11/1441* (2013.01); *H04N 1/00832* (2013.01); *H04N 1/32112* (2013.01); *H04N 1/32358* (2013.01); *G06F 11/3476* (2013.01); *H04N 2201/0094* (2013.01); *H04N 2201/3202* (2013.01); *H04N 2201/325* (2013.01); *H04N 2201/3274* (2013.01); *H04N 2201/3287* (2013.01)

(58) Field of Classification Search
None
See application file for complete search history.

(56) References Cited

U.S. PATENT DOCUMENTS

2007/0133043 A1* 6/2007 Maekawa et al. ............ 358/1.15
2010/0257141 A1* 10/2010 Monet ............... G06F 17/30011
707/665

FOREIGN PATENT DOCUMENTS

JP 2006303563 11/2006

* cited by examiner

*Primary Examiner* — Helen Q Zong
(74) *Attorney, Agent, or Firm* — K&L Gates LLP

(57) ABSTRACT

An image forming apparatus of the present disclosure includes an image output unit, a nonvolatile storage unit, an original-image generating device, and a log-image generating device. The image output unit outputs an image. The nonvolatile storage unit stores information even in the event of a power interruption. The original-image generating device generates an original image in the nonvolatile storage unit. The log-image generating device generates a log image based on the original image. Further, when the image forming apparatus is started, if the original image is stored in the nonvolatile storage unit, the log-image generating device generates the log image based on the original image stored in the nonvolatile storage unit.

3 Claims, 6 Drawing Sheets

IMAGE FORMING APPARATUS THAT GENERATES LOG IMAGE, IMAGE FORMING SYSTEM, AND NON-TRANSITORY RECORDING MEDIUM

INCORPORATION BY REFERENCE

This application is based upon, and claims the benefit of priority from, corresponding Japanese Patent Application No. 2012-263848, filed in the Japan Patent Office on Nov. 30, 2012, the entire contents of which are incorporated herein by reference.

FIELD

Unless otherwise indicated herein, the description in this background section is not prior art to the claims in this application and is not admitted to be prior art by inclusion in this section. The present disclosure relates to an image forming apparatus that generates a log image as a log of an output image, an image forming system, and a non-transitory recording medium that stores a program.

BACKGROUND

A typical image forming apparatus includes a print unit configured to print an image, a hard disk capable of storing information, an image reading unit configured to generate an image on which the image printed by the print unit is based, and a log creating device configured to create a log file on the hard disk as a log of the image printed by the print unit.

However, in the typical image forming apparatus described above, if a power interruption occurs after an image is printed by the print unit and before the creation of the log file is completed, the log file may not be created by the log creating device.

SUMMARY

The present disclosure relates to an image forming apparatus capable of generating a log image after power resumption, even if a power interruption occurs after output of an image and before completion of log image generation, an image forming system, and a non-transitory recording medium that stores a program.

An image forming apparatus according to an embodiment of the present disclosure includes an image output unit, a nonvolatile storage unit, an original-image generating device, and a log-image generating device. The image output unit outputs an image. The nonvolatile storage unit stores information even in the event of a power interruption. The original-image generating device generates an original image in the nonvolatile storage unit, the original image being an image on which an output image to be outputted by the image output unit is based. The log-image generating device generates a log image based on the original image, the log image serving as a log of the output image. Further, when the image forming apparatus is started, if the original image is stored in the nonvolatile storage unit, the log-image generating device generates the log image based on the original image stored in the nonvolatile storage unit.

The image forming system according to an embodiment of the present disclosure includes an image forming apparatus coupled to a network and a server coupled to the network. The image forming apparatus includes an image output unit, a nonvolatile storage unit, an original-image generating device, a log-image generating device, and a log-image transmitting device. The image output unit outputs an image. The nonvolatile storage unit stores information even in the event of a power interruption. The original-image generating device generates an original image in the nonvolatile storage unit, the original image being an image on which an output image to be outputted by the image output unit is based. The log-image generating device generates a log image based on the original image, the log image serving as a log of the output image. The log-image transmitting device transmits the log image generated by the log-image generating device to the server. The server includes a log-image storage device and a log-image writing device. The log-image storage device stores the log image. The log-image writing device writes the log image transmitted from the image forming apparatus to the log-image storage device. Further, when the image forming apparatus is started, if the original image is stored in the nonvolatile storage unit, the log-image generating device generates the log image based on the original image stored in the nonvolatile storage unit.

A non-transitory recording medium according to an embodiment of the present disclosure that stores a program executed by an image forming apparatus includes an image output unit and a nonvolatile storage unit. The image output unit outputs an image. The nonvolatile storage unit stores information even in the event of a power interruption. The program causes the image forming apparatus to function as an original-image generating device and a log-image generating device. The original-image generating device generates an original image in the nonvolatile storage unit, the original image being an image on which an output image to be outputted by the image output unit is based. The log-image generating device generates a log image based on the original image, the log image serving as a log of the output image. Further, when the image forming apparatus is started, if the original image is stored in the nonvolatile storage unit, the log-image generating device generates the log image based on the original image stored in the nonvolatile storage unit.

Additional features and advantages are described herein, and will be apparent from the following Detailed Description and the figures.

DETAILED DESCRIPTION

An embodiment of the present disclosure will now be described with reference to the drawings.

First, a configuration of an image forming system 10 according to an embodiment will be described.

Figure 1:
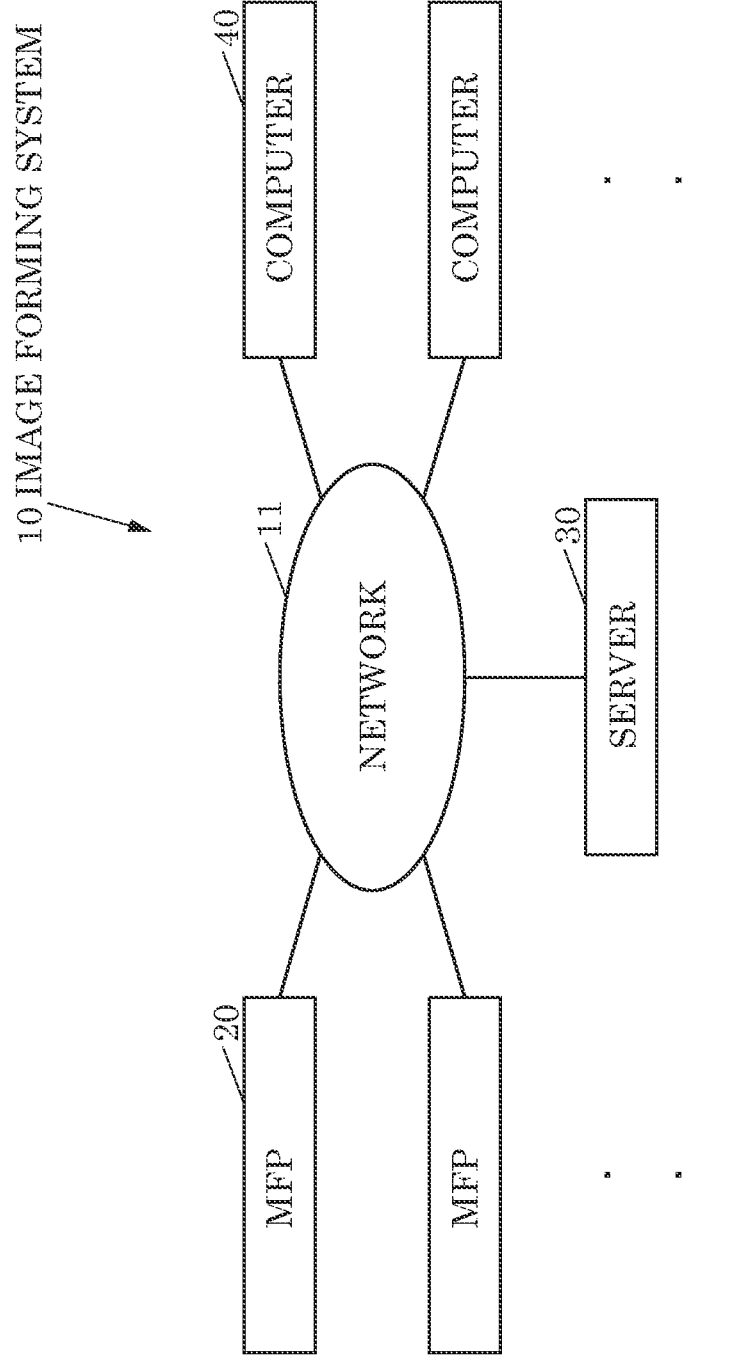
FIG. 1 is a block diagram illustrating a configuration of an image forming system according to an embodiment of the present disclosure.

FIG. 1 is a block diagram illustrating the configuration of the image forming system 10 according to an embodiment.

As illustrated in FIG. 1, the image forming system 10 includes many multifunction peripherals (MFPs) including an MFP 20, a server 30 configured to store log images as logs of output images output by the MFPs, and many computers including a computer 40 capable of transmitting print data to the MFPs. The many MFPs and the server 30 are connected via a network 11, such as a local area network (LAN) or the Internet, such that they can communicate with each other. Similarly, the many MFPs and computers are connected via the network 11 such that they can communicate with each other. The many MFPs each form the image forming apparatus of an embodiment of the present disclosure.

The configuration of each of the many MFPs included in the image forming system 10 is the same as the configuration of the MFP 20. Therefore, the MFP 20 will be described as a representative of the many MFPs included in the image forming system 10.

Similarly, the configuration of each of the many computers included in the image forming system 10 is the same as the configuration of the computer 40. Therefore, the computer 40 will be described as a representative of the many computers included in the image forming system 10.

Figure 2:
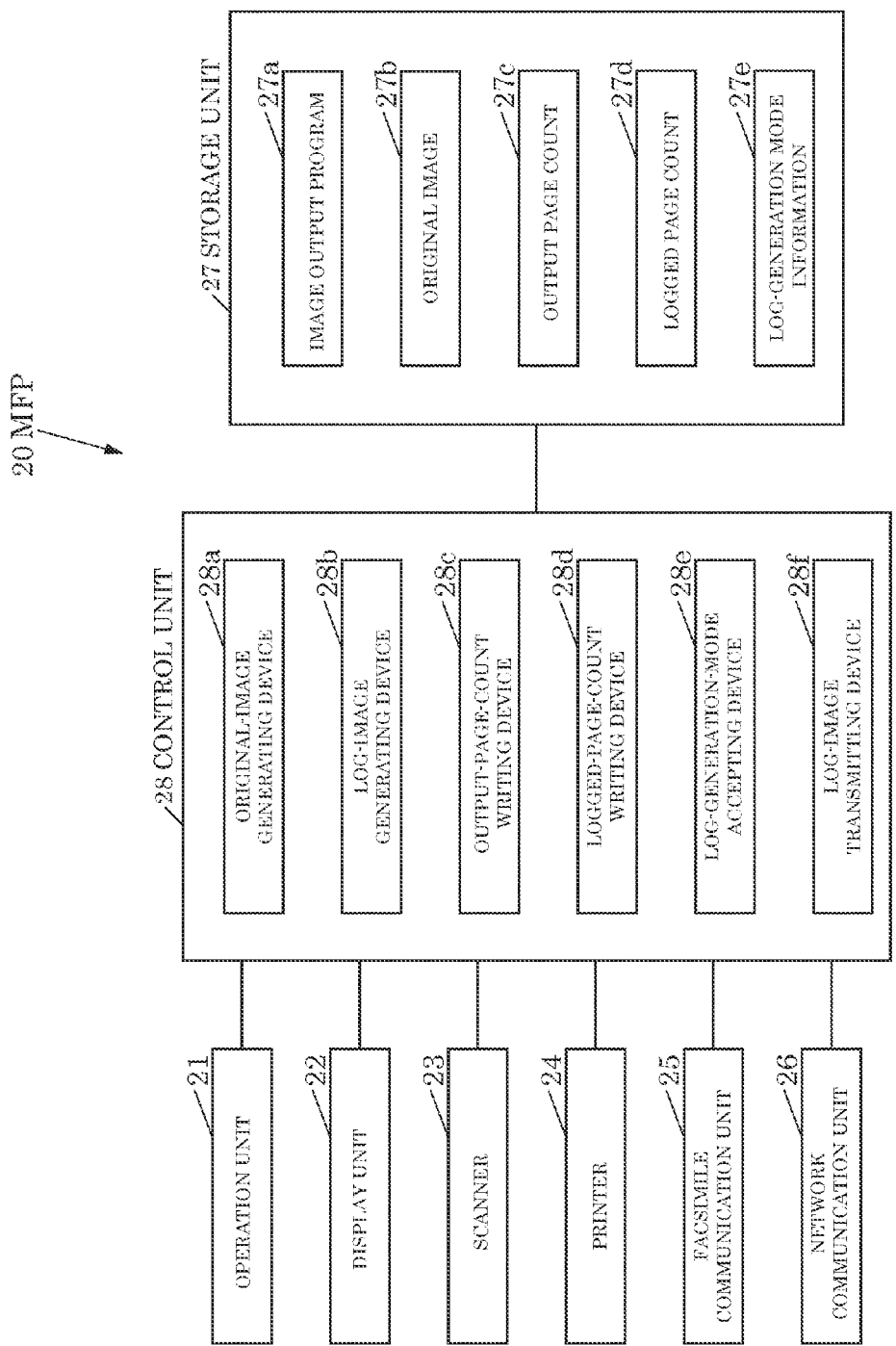
FIG. 2 is a block diagram illustrating a configuration of a multifunction peripheral (MFP) in the image forming system.

FIG. 2 is a block diagram illustrating the configuration of the MFP 20.

As illustrated in FIG. 2, the MFP 20 includes an operation unit 21, such as buttons, for a user to input various operations; a display unit 22, such as a liquid crystal display (LCD), that displays various information; a scanner 23 that reads an image from a document; a printer 24 that performs printing on a recording medium, such as a sheet; a facsimile communication unit 25 that performs facsimile communication with a facsimile apparatus (external unit not shown) via a communication line, such as a public telephone line; a network communication unit 26 that communicates with another device (external unit) via the network 11 (see FIG. 1); a storage unit 27 which is a nonvolatile storage device, such as an electrically erasable programmable read-only memory (EEPROM) or a hard disk drive (HDD), that stores various data; and a control unit 28 that controls an overall operation of the MFP 20.

The operation unit 21 may include an input device that forms a touch panel together with the display unit 22.

The printer 24 is a device that outputs an image by means of printing, and forms an image output unit of the present disclosure.

The facsimile communication unit 25 is a device that outputs an image by means of facsimile transmission, and forms the image output unit of the present disclosure.

The network communication unit 26 is a device that outputs an image by means of electronic transmission via the network 11, such as electronic mail transmission, and forms the image output unit of the present disclosure.

The storage unit 27 is a device that stores information even in the event of a power interruption, and forms a nonvolatile storage unit of the present disclosure.

The storage unit 27 stores an image output program 27a executed by the MFP 20. The image output program 27a may be installed on the MFP 20 during manufacture of the MFP 20, or may be installed on the MFP 20 from a storage medium, such as a secure digital (SD) card or a universal serial bus (USB) memory, or from the network 11.

The storage unit 27 is capable of storing a plurality of original images 27b, each being an image on which an output image outputted by the printer 24, the facsimile communication unit 25, or the network communication unit 26 is based. For example, the original images 27b are Joint Photographic Experts Group (JPEG) images.

The storage unit 27 is capable of storing a plurality of output page counts 27c, each representing the number of output pages of the corresponding original image 27b, the output pages being pages that have been outputted by the printer 24, the facsimile communication unit 25, or the network communication unit 26. The output page count 27c is associated with the corresponding original image 27b and stored in the storage unit 27.

The storage unit 27 is also capable of storing a plurality of logged page counts 27d, each representing the number of logged pages of the corresponding original image 27b, the logged pages being pages for which log images have been generated. The logged page count 27d is associated with the corresponding original image 27b and stored in the storage unit 27.

The storage unit 27 is also capable of storing log-generation mode information 27e indicating a log-image generation mode. Either a post-output generation mode for generating a log image after image output or an output-in-progress generation mode for generating a log image during image output is designated as the log-generation mode information 27e.

The control unit 28 includes, for example, a central processing unit (CPU), a read-only memory (ROM) that stores a program and various data in advance, and a random-access memory (RAM) used as a work area for the CPU. The CPU is configured to execute the program stored in the ROM or the storage unit 27.

By executing the image output program 27a stored in the storage unit 27, the control unit 28 functions as an original-image generating device 28a that generates the original image 27b in the storage unit 27, a log-image generating device 28b that generates a log image as a log of an output image based on the original image 27b, an output-page-count writing device 28c that writes the output page count 27c to the storage unit 27, a logged-page-count writing device 28d that writes the logged page count 27d to the storage unit 27, a log-generation-mode accepting device 28e that accepts designation of a log-image generation mode, and a log-image transmitting device 28f that transmits a log image generated by the log-image generating device 28b to the server 30 (see FIG. 1).

The log image generated by the log-image generating device 28b is, for example, a portable document format (PDF) image.

Figure 3:
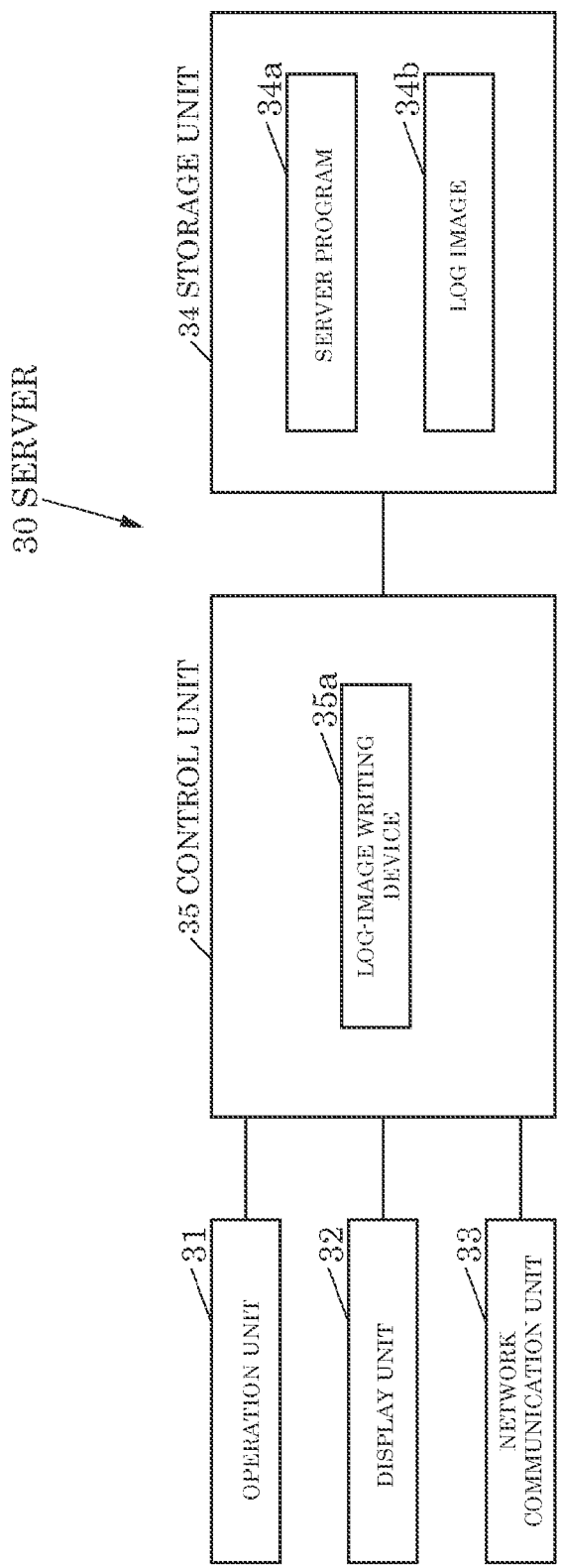
FIG. 3 is a block diagram illustrating a configuration of a server in the image forming system.

FIG. 3 is a block diagram illustrating the configuration of the server 30.

As illustrated in FIG. 3, the server 30 includes an operation unit 31 which is an input device, such as a mouse or a keyboard, used to input various operations; a display unit 32, such as an LCD, that displays various information; a network communication unit 33 that communicates with another device (external unit) via the network 11 (see FIG. 1); a storage unit 34 which is a nonvolatile storage device, such as a HDD, that stores a program and various data; and a control unit 35 that controls an overall operation of the server 30. The server 30 is formed, for example, by a computer, such as a personal computer (PC).

The storage unit 34 stores a server program 34a which is a program for the server 30. The server program 34a may be installed on the server 30 during manufacture of the server 30, or may be installed on the server 30 from a storage medium, such as a compact disk (CD) or a digital versatile disk (DVD), or from the network 11.

The storage unit 34 is capable of storing a log image 34b transmitted from the MFP 20. That is, the storage unit 34 forms a log-image storage device of the present disclosure.

The control unit 35 includes, for example, a CPU, a ROM that stores a program and various data in advance, and a RAM used as a work area for the CPU. The CPU is configured to execute the program stored in the ROM or the storage unit 34.

By executing the server program 34a stored in the storage unit 34, the control unit 35 functions as a log-image writing device 35a that writes the log image 34b transmitted from the MFP 20 to the storage unit 34.

The computer 40 illustrated in FIG. 1 is, for example, a PC.

Next, the operation of the image forming system 10 will be described.

First a description will be given of how the MFP 20 operates to accept designation of a log-image generation mode.

When one of the post-output generation mode and the output-in-progress generation mode is designated via the operation unit 21 as a log-image generation mode, the log-generation-mode accepting device 28e in the control unit 28 of the MFP 20 accepts the designated mode and stores it in the log-generation mode information 27e in the storage unit 27. That is, if the post-output generation mode is designated, the log-generation-mode accepting device 28e writes the post-output generation mode as the log-generation mode information 27e, and if the output-in-progress generation mode is designated, the log-generation-mode accepting device 28e writes the output-in-progress generation mode as the log-generation mode information 27e.

A description will now be given of how the MFP 20 operates for performing a copy job when the post-output generation mode is designated as the log-generation mode information 27e.

Figure 4:
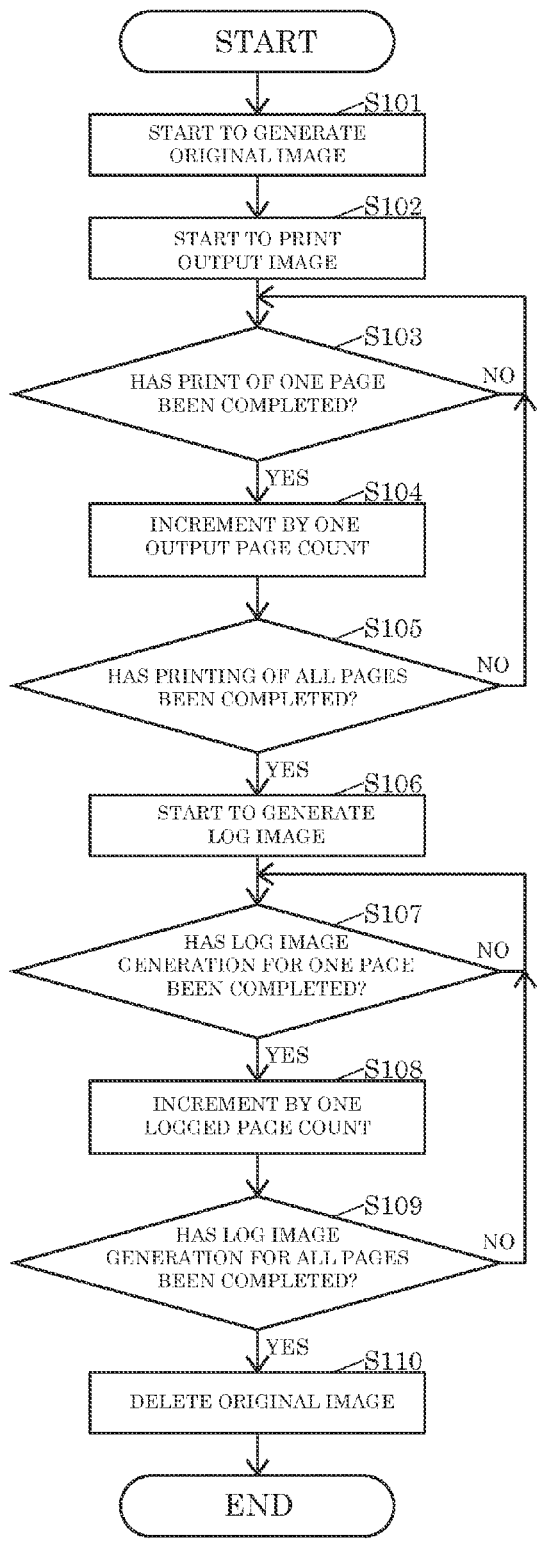
FIG. 4 is a flowchart illustrating an operation of the MFP for performing a copy job when a post-output generation mode is designated as log-generation mode information.

FIG. 4 is a flowchart illustrating the operation of the MFP 20 for performing a copy job when the post-output generation mode is designated as the log-generation mode information 27e.

When the post-output generation mode is designated as the log-generation mode information 27e, if a copy instruction is received via the operation unit 21, the control unit 28 of the MFP 20 starts the operation illustrated in FIG. 4.

As illustrated in FIG. 4, the original-image generating device 28a of the control unit 28 starts to generate the original image 27b in the storage unit 27 based on an image read from a document by the scanner 23 (step S101). The original-image generating device 28a associates the generated original image 27b with an ID of a user who is logged in to the MFP 20 at the time of generating the original image 27b, that is, with an ID of a user who has given an instruction to generate the original image 27b. Then, the original-image generating device 28a writes the original image 27b to the storage unit 27.

Next, the control unit 28 starts to cause the printer 24 to print, on a recording medium, an output image based on the original image 27b generated in the storage unit 27 by the operation started in step S101 (step S102).

The control unit 28 continues to determine whether printing of one page has been completed until it determines that printing of one page has been completed (step S103).

If it is determined in step S103 that printing of one page has been completed, the output-page-count writing device 28c of the control unit 28 increments, by one, the output page count 27c of the original image 27b of this job stored in the storage unit 27 (step S104).

Next, the control unit 28 determines whether printing of all pages of the original image 27b generated in the storage unit 27 by the operation started in step S101 has been completed (step S105).

If the control unit 28 determines in step S105 that printing of all pages of the original image 27b has not been completed, the process returns to step S103.

On the other hand, if it is determined in step S105 that printing of all pages of the original image 27b has been completed, the log-image generating device 28b of the control unit 28 starts to generate a log image on the basis of the original image 27b in the storage unit 27 (step S106). The log-image generating device 28b associates the generated log image with the same ID as the user ID associated with the original image 27b, and writes the log image to the storage unit 27.

The control unit 28 continues to determine whether log image generation for one page has been completed until it determines that log image generation for one page has been completed (step S107).

If it is determined in step S107 that log image generation for one page has been completed, the logged-page-count writing device 28d of the control unit 28 increments, by one, the logged page count 27d of the original image 27b of this job stored in the storage unit 27 (step S108).

Next, the control unit 28 determines whether log image generation for all pages of the original image 27b generated in the storage unit 27 by the operation started in step S101 has been completed (step S109).

If the control unit 28 determines in step S109 that log image generation for all pages of the original image 27b has not been completed, the process returns to step S107.

On the other hand, if it is determined in step S109 that log image generation for all pages of the original image 27b has been completed, the control unit 28 deletes the original image 27b of this job from the storage unit 27 (step S110) and ends the operation illustrated in FIG. 4.

A description will now be given of how the MFP 20 operates for performing a copy job when the output-in-progress generation mode is designated as the log-generation mode information 27e.

Figure 5:
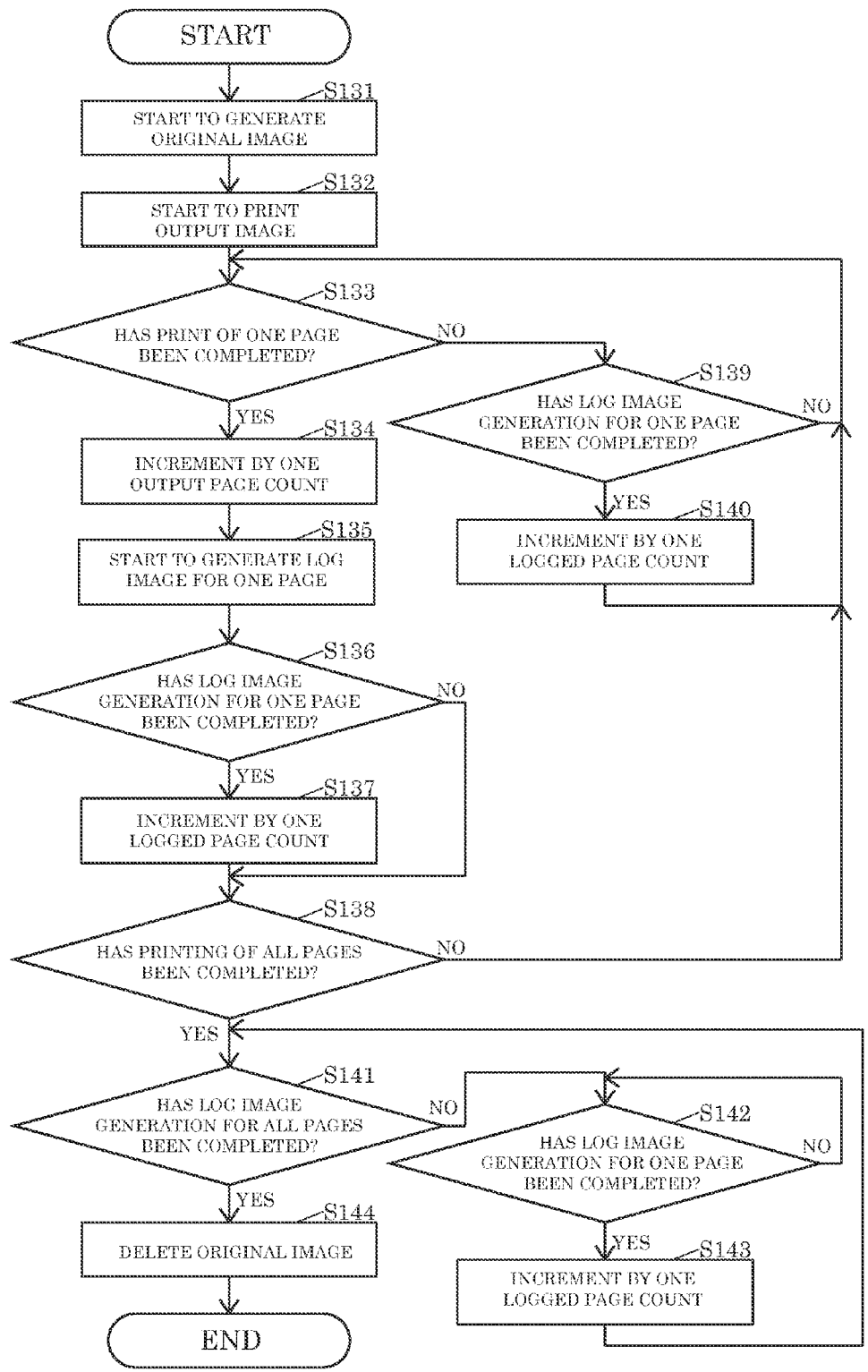
FIG. 5 is a flowchart illustrating an operation of the MFP for performing a copy job when an output-in-progress generation mode is designated as log-generation mode information.

FIG. 5 is a flowchart illustrating the operation of the MFP 20 for performing a copy job when the output-in-progress generation mode is designated as the log-generation mode information 27e.

When the output-in-progress generation mode is designated as the log-generation mode information 27e, if a copy instruction is received via the operation unit 21, the control unit 28 of the MFP 20 starts the operation illustrated in FIG. 5.

As illustrated in FIG. 5, the original-image generating device 28a of the control unit 28 starts to generate the original image 27b in the storage unit 27 on the basis of an image read from a document by the scanner 23 (step S131). The original-image generating device 28a associates the generated original image 27b with an ID of a user who is logged in to the MFP 20 at the time of generating the original image 27b, that is, with an ID of a user who has given an instruction to generate the original image 27b. Then, the original-image generating device 28a writes the original image 27b to the storage unit 27.

Next, the control unit 28 starts to cause the printer 24 to print, on a recording medium, an output image based on the original image 27b generated in the storage unit 27 by the operation started in step S131 (step S132).

Next, the control unit 28 determines whether printing of one page has been completed (step S133).

If it is determined in step S133 that printing of one page has been completed, the output-page-count writing device 28c of the control unit 28 increments, by one, the output page count 27c of the original image 27b of this job stored in the storage unit 27 (step S134).

Next, based on the one page of the original image 27b in the storage unit 27, the log-image generating device 28b of the control unit 28 starts to generate a log image for the one page (step S135). The log-image generating device 28b associates the generated log image with the same ID as the user ID associated with the original image 27b, and writes the log image to the storage unit 27.

Next, the control unit 28 determines whether log image generation for one page has been completed (step S136).

If it is determined in step S136 that log image generation for one page has been completed, the logged-page-count writing device 28d of the control unit 28 increments, by one, the logged page count 27d of the original image 27b of this job stored in the storage unit 27 (step S137).

If it is determined in step S136 that log image generation for one page has not been completed or if the operation in step S137 ends, the control unit 28 determines whether printing of all pages of the original image 27b generated in the storage unit 27 by the operation started in step S131 has been completed (step S138).

If the control unit 28 determines in step S138 that printing of all pages of the original image 27b has not been completed, the process returns to step S133.

If it is determined in step S133 that printing of one page has not been completed, the control unit 28 determines whether log image generation for one page has been completed (step S139).

If it is determined in step S139 that log image generation for one page has been completed, the logged-page-count writing device 28d of the control unit 28 increments, by one, the logged page count 27d of the original image 27b of this job stored in the storage unit 27 (step S140).

If the control unit 28 determines in step S139 that log image generation for one page has not been completed or if the operation in step S140 ends, the process returns to step S133.

If it is determined in step S138 that printing of all pages of the original image 27b has been completed, the control unit 28 determines whether log image generation for all pages of the original image 27b generated in the storage unit 27 by the operation started in step S135 has been completed (step S141).

If it is determined in step S141 that log image generation for all pages of the original image 27b has not been completed, the control unit 28 continues to determine whether log image generation for one page has been completed until it determines that log image generation for one page has been completed (step S142).

If it is determined in step S142 that log image generation for one page has been completed, the logged-page-count writing device 28d of the control unit 28 increments, by one, the logged page count 27d of the original image 27b of this job stored in the storage unit 27 (step S143). Then, the process returns to step S141.

If it is determined in step S141 that log image generation for all pages of the original image 27b has been completed, the control unit 28 deletes the original image 27b of this job from the storage unit 27 (step S144) and ends the operation illustrated in FIG. 5.

Next, a description will be given of how the MFP 20 operates when started.

Figure 6:
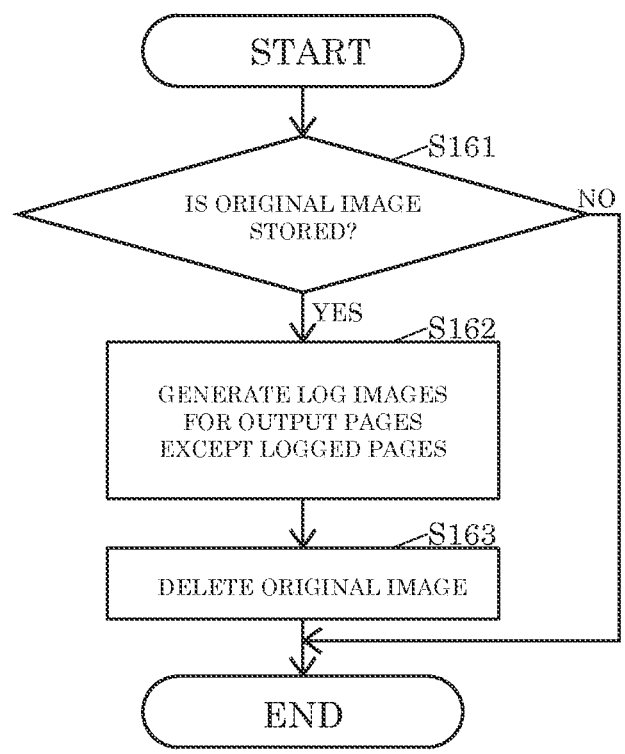
FIG. 6 is a flowchart illustrating an operation of the MFP when started.

FIG. 6 is a flowchart illustrating the operation of the MFP 20 when started.

When started, the control unit 28 of the MFP 20 starts the operation illustrated in FIG. 6.

As illustrated in FIG. 6, the control unit 28 determines whether the original image 27b is stored in the storage unit 27 (step S161). In performing the copy job illustrated in FIG. 4, if power to the MFP 20 is interrupted after generation of the original image 27b and before performing the operation in step S110, the original image 27b remains stored in the storage unit 27. In performing the copy job illustrated in FIG. 5, if power to the MFP 20 is interrupted after generation of the original image 27b and before performing the operation in step S144, the original image 27b remains stored in the storage unit 27.

If it is determined in step S161 that the original image 27b is not stored in the storage unit 27, the control unit 28 ends the operation illustrated in FIG. 6.

On the other hand, if it is determined in step S161 that the original image 27b is stored in the storage unit 27, the log-image generating device 28b of the control unit 28 generates log images for output pages, except logged pages, of the original image 27b in the storage unit 27 based on the output pages, except logged pages, of the original image 27b, that is, based on the output pages corresponding to the output page count 27c of the original image 27b, except logged pages corresponding to the logged page count 27d of the original image 27b (step S162). The log-image generating device 28b associates the generated log images with the same ID as the user ID associated with the original image 27b, and writes the log images to the storage unit 27.

Next, the control unit 28 deletes the original image 27b from the storage unit 27 (step S163) and ends the operation illustrated in FIG. 6.

Log images generated in the process of FIG. 4, 5, or 6 and a user ID associated with the log images are transmitted at predetermined intervals, such as every hour, via the network 11 to the server 30 by the log-image transmitting device 28f in the control unit 28 of the MFP 20.

When the control unit 35 of the server 30 receives, via the network 11, the log images and the user ID associated therewith, the log-image writing device 35a in the control unit 35 writes the received log images as the log image 34b to the storage unit 34. The received user ID is associated with the log image 34b and also written to the storage unit 34.

In the description above, a copy job has been described as an example of output of an output image. The same applies to the case where the MFP 20 outputs an output image by means of printing in a job other than a copy job. An example of such a job is a print job in which, based on print data received from the computer 40, the MFP 20 outputs an output image on the printer 24. The same also applies to the case of a job in which the MFP 20 outputs an output image by means of a method other than printing. Examples of such a job include a facsimile transmission job in which the MFP 20 outputs an image by means of facsimile transmission performed by the facsimile communication unit 25, and a transmission job in which the MFP 20 outputs an image by means of electronic transmission performed by the network communication unit 26 via the network 11.

As described above, when the MFP 20 of the image forming system 10 is started, if the original image 27b of an output image is stored in the storage unit 27 (YES in step S161), the MFP 20 generates a log image based on the original image 27b stored in the storage unit 27. Therefore, even if a power interruption occurs after an image is output by the process illustrated in FIG. 4 or 5 and before log image generation ends, log image generation can be carried out (step S162) after power resumption.

In the image forming system 10, log images generated after power to the MFP 20 is resumed are received from the MFP 20 and stored on the server 30. Therefore, log images for an output image owned by the user of the MFP 20 can be kept track of more accurately than before by an administrator who uses the server 30. For example, even if there is information leakage through an output image, the administrator can more accurately identify the leaker (user) than before, based on the user ID associated with the log image 34b on the server 30.

When the MFP 20 is started, if the original image 27b of an output image is stored in the storage unit 27 (YES in step S161), the MFP 20 generates only necessary log images based on the output pages, except logged pages, of the original image 27b of the output image (step S162). Therefore, as compared to a configuration in which log images are generated based on the output pages, including logged pages, of the original image 27b of the output image, the load of processing for log image generation can be reduced. For example, if the number of pages of the original image 27b stored in the storage unit 27, the output page count 27c, and the logged page count 27d are five, three, and two, respectively, the MFP 20 generates a log image for only a page obtained by excluding the two logged pages from the three output pages of the five pages of the original image 27b, that is, the MFP 20 generates a log image for only the third page of the original image 27b based on the third page.

When the MFP 20 is started, if the original image 27b of an output image is stored in the storage unit 27, the MFP 20 may generate log images based on the output pages, including logged pages, of the original image 27b of the output image. For example, if the number of pages of the original image 27b stored in the storage unit 27 and the output page count 27c are five and three, respectively, the MFP 20 may generate log images for the three output pages (i.e., the first to third pages) of the five pages of the original image 27b regardless of the logged page count 27d, based on the first to third pages of the original image 27b.

When the MFP 20 is started, if the original image 27b of an output image is stored in the storage unit 27 (YES in step S161), the MFP 20 generates log images based on the output pages of the original image 27b of the output image (step S162). Therefore, as compared to a configuration in which log images are generated based on all of the pages, including pages other than output pages, of the original image 27b of the output image, the log images can be more consistent with the actual output image.

While various aspects and embodiments have been disclosed herein, other aspects and embodiments are possible. Other designs may be used in which the above-described components are each present.

For example, when the MFP 20 is started, if the original image 27b of an output image is stored in the storage unit 27, the MFP 20 may generate log images based on all of the pages, including pages other than output pages, of the original image 27b of the output image. For example, if the number of pages of the original image 27b stored in the storage unit 27 is five, the MFP 20 may generate log images for the first to fifth pages of the original image 27b based on the five pages of the original image 27b, regardless of the output page count 27c and the logged page count 27d.

In an embodiment, the MFP 20 is configured such that after a log image generated by the log-image generating device 28b is temporarily stored in the storage unit 27, the stored log image is transmitted to the server 30 by the log-image transmitting device 28f. Alternatively, the MFP 20 may be configured such that a log image generated by the log-image generating device 28b is transmitted, without being temporarily stored in the storage unit 27, to the server 30 by the log-image transmitting device 28f.

In an embodiment, the image forming system 10 includes an MFP as an image forming apparatus of the present disclosure. The image forming system 10 may include an image forming apparatus other than the MFP, such as a printer-only machine, a copier-only machine, or a fax-only machine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image forming apparatus comprising:
a control unit;
an image output unit configured to output an image; and
a nonvolatile storage unit configured to store information even in the event of a power interruption,
the control unit including:
an original-image generating device configured to generate an original image in the nonvolatile storage unit, the original image being an image on which an output image to be outputted by the image output unit is based;
a log-image generating device configured to generate a log image based on the original image and to write the log image to the nonvolatile storage unit, the log image serving as a log of the output image;
an output-page-count writing device configured to write an output page count to the nonvolatile storage unit, the output page count representing a number of output pages of all pages of the original image generated by the original-image generating device, the output pages being pages for which the output image has been outputted by the image output unit; and
a logged-page-count writing device configured to write a logged page count to the nonvolatile storage unit, the logged page count representing a number of logged pages of all pages of the original image generated by the original-image generating device, the logged pages being pages for which the log image has been generated by the log-image generating device,
wherein:
if it is determined that generation of the log image for all pages of the original image of a job has been completed, the control unit deletes all pages of the original image of the job from the nonvolatile storage unit;
when power to the image forming apparatus is interrupted after generating all pages of the original image of the job and before deleting all pages of the original image of the job from the nonvolatile storage unit, and then the image forming apparatus is started, the control unit determines whether the original image is stored in the nonvolatile storage unit; and
if the control unit determines that the original image is stored in the nonvolatile storage unit, the log-image generating device generates the log image for the output pages obtained by excluding the logged pages from the output pages of the original image stored in the nonvolatile storage unit, the output pages corresponding to the output page count stored in the nonvolatile storage unit and the logged pages corresponding to the logged page count stored in the nonvolatile storage unit.

2. An image forming system comprising:
an image forming apparatus coupled to a network; and
a server coupled to the network,
the image forming apparatus including:

a control unit;
an image output unit configured to output an image; and
a nonvolatile storage unit configured to store information even in the event of a power interruption,
wherein the control unit includes:
an original-image generating device configured to generate an original image in the nonvolatile storage unit, the original image being an image on which an output image to be outputted by the image output unit is based;
a log-image generating device configured to generate a log image based on the original image and to write the log image to the nonvolatile storage unit, the log image serving as a log of the output image;
an output-page-count writing device configured to write an output page count to the nonvolatile storage unit, the output page count representing a number of output pages of all pages of the original image generated by the original-image generating device, the output pages being pages for which the output image has been outputted by the image output unit; and
a logged-page-count writing device configured to write a logged page count to the nonvolatile storage unit, the logged page count representing a number of logged pages of all pages of the original image generated by the original-image generating device, the logged pages being pages for which the log image has been generated by the log-image generating device, and
a log-image transmitting device configured to transmit the log image generated by the log-image generating device in the nonvolatile storage unit to the server,
wherein the server includes:
a log-image storage device configured to store the log image; and
a log-image writing device configured to write the log image transmitted from the image forming apparatus to the log-image storage device, and
wherein:
if it is determined that generation of the log image for all pages of the original image of a job has been completed, the control unit deletes all pages of the original image of the job from the nonvolatile storage unit;
when power to the image forming apparatus is interrupted after generating all pages of the original image of the job and before deleting all pages of the original image of the job from the nonvolatile storage unit, and then the image forming apparatus is started, the control unit determines whether the original image is stored in the nonvolatile storage unit; and
if the control unit determines that the original image is stored in the nonvolatile storage unit, the log-image generating device generates the log image for the output pages obtained by excluding the logged pages from the output pages of the original image stored in the nonvolatile storage unit, the output pages corresponding to the output page count stored in the nonvolatile storage unit and the logged pages corresponding to the logged page count stored in the nonvolatile storage unit.

3. A non-transitory recording medium that stores a program executed by an image forming apparatus including a control unit, an image output unit configured to output an image, and a nonvolatile storage unit configured to store information even in the event of a power interruption,
the program causing the control unit in the image forming apparatus to function as:
an original-image generating device configured to generate an original image in the nonvolatile storage unit, the original image being an image on which an output image to be outputted by the image output unit is based;
a log-image generating device configured to generate a log image based on the original image and to write the log image to the nonvolatile storage the log image serving as a log of the output image;
an output-page-count writing device configured to write an output page count to the nonvolatile storage unit, the output page count representing a number of output pages of all pages of the original image generated by the original-image generating device, the output pages being pages for which the output image has been outputted by the image output unit; and
a logged-page-count writing device configured to write a logged page count to the nonvolatile storage unit, the logged page count representing a number of logged pages of all pages of the original image generated by the original-image generating device, the logged pages being pages for which the log image has been generated by the log-image generating device,
wherein:
if it is determined that generation of the log image for all pages of the original image of a job has been completed, the control unit deletes all pages of the original image of the job from the nonvolatile storage unit;
when power to the image forming apparatus is interrupted after generating all pages of the original image of the job and before deleting all pages of the original image of the job from the nonvolatile storage unit, and then the image forming apparatus is started, the control unit determines whether the original image is stored in the nonvolatile storage unit; and
if the control unit determines that the original image is stored in the nonvolatile storage unit, the log-image generating device generates the log image for the output pages obtained by excluding the logged pages from the output pages of the original image stored in the nonvolatile storage unit, the output pages corresponding to the output page count stored in the nonvolatile storage unit and the logged pages corresponding to the logged page count stored in the nonvolatile storage unit.

* * * * *